3,573,260
PROCESS OF PREPARING SOLID MOLDING POWDER FROM POLYTRIMELLITATE AMIDE-IMIDES
Edwin F. Morello, Hammond, Ind., assignor to Standard Oil Company, Chicago, Ill.
No Drawing. Filed Aug. 26, 1968, Ser. No. 755,432
Int. Cl. C08g 20/32
U.S. Cl. 260—78
6 Claims

ABSTRACT OF THE DISCLOSURE

A process for preparing solid molding powder and shaped articles from polytrimellitate amide-imides. The process comprises treating polyamide-imides prepared by reacting equimolar amounts of an aromatic primary diamine and an acyl halide derivative of trimellitic anhydride with a nitrogen or a sulfoxide containing organic polar solvent and water or organic diluent having a boiling point below that of the organic polar solvent, volatilizing the solvent diluent mixture and then heating the polytrimellitamide-imide to a temperature above the boiling point of the diluent but below the boiling point of the organic polar solvent to remove substantially all of the diluent and then heating the polymer at a temperature of about 170 to 280° C. to remove the residual solvent, but conducting the heating at a rate so that degradation is avoided at the surface of the polytrimellitamide-imide powder. Also a process for the fabrication of shaped articles from the molding powder which comprises applying a pressure of 200 to 25,000 p.s.i. to the molding powder which has been heated to a temperature with in the range of about 575 to 700° F. and subsequently ejecting the coalesced polyamide-imide in the form of a shaped particle.

---

This invention relates to molding powders and the fabrication of shaped particles from high molecular weight polymers derived from the reaction of acyl halide derivatives of trimellitic anhydride and aromatic organic primary diamines. The molding powder prepared according to the process of this invention is useful for the fabrication of shaped articles of manufacture. For example, cooking utensils which require high thermal resistance.

Prior experimentation revealed that molded forms having inferior physical and thermal properties were produced when polymer powders, not having been treated by the process of this invention, were molded. The molded articles were extremely friable and could not be removed from the mold without fracturing.

The polymers useful for the preparation of the molding powder of this invention are advantageously prepared by reacting acyl halide derivatives of trimellitic anhydride and aromatic primary diamines. The resulting products are polyamides wherein the linking groups are predominantly amide, although some may be imido, and wherein the polymeric structure contains free carboxyl groups which are capable of further reaction. Such polyamides are high molecular weight polymeric compounds having in their molecule units of:

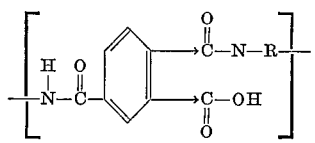

wherein → denotes isomerism and wherein R is a divalent aromatic organic radical. This organic radical consists of R′, which is a divalent aromatic hydrocarbon radical or two R′ divalent aromatic hydrocarbon radicals joined by stable linkages $$-O-, \ -CH_2-, \ -\underset{\underset{O}{\|}}{C}-, \ -\underset{\underset{O}{\|}}{\overset{O}{\|}}{S}-, \text{ and } -S-$$

as are in the groups $$-R'-O-R'-, -R'-CH_2-R'-, -R'-\underset{\underset{O}{\|}}{C}-R'-, -R'-\underset{\underset{O}{\|}}{\overset{O}{\|}}{S}-R'-$$

and $-R'-S-R'-$

The molecular weight of these polyamides is sufficiently high to produce upon heating a film-forming polymer. Said amides are susceptible to condensation by heating to a polyamide-imide having to a substantial extent recurring units of

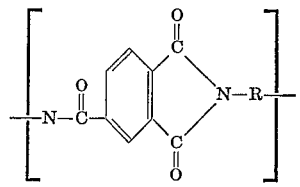

wherein R is a divalent aromatic organic radical in which in addition to hydrogen, nitrogen, sulphur and oxygen atoms can be attached to the carbon atoms. This organic radical consists of R′, which is a divalent aromatic hydrocarbon radical or two R′ divalent aromatic hydrocarbon radicals joined by stable linkages $$-O-, \ CH_2-, \ -\underset{\underset{O}{\|}}{C}-, \ -\underset{\underset{O}{\|}}{\overset{O}{\|}}{S}-, \text{ and } -S-$$

as are in the groups $$-R'-O-R'-, -R'-CH_2-R'-, -R'-\underset{\underset{O}{\|}}{C}-R'-, -R'-\underset{\underset{O}{\|}}{\overset{O}{\|}}{S}-R'-,$$

and $-R'-S-R'-$

A typical polymer has up to 40 percent of its 1,2 position imidized prior to heat treatment. Usually about 10 to 40 percent of the 1,2 position is imidized prior to heat treatment.

The poly-amide-imides are prepared from an acyl halide derivative of trimellitic anhydride (1,2,4-benzene tricarboxylic acid anhydride) having at least one acyl halide and that in the 4-ring position, which includes derivatives such as the 4-acid chloride, 1,4- and 2,4-diacid chloride. The bromide and other reactive halide derivatives are also suitable. The acyl halide derivative is reacted with an aromatic diamine having one or more aromatic rings and two primary amino groups. These aromatic diamines have the formula $H_2N-R'-NH_2, H_2N-R'-O-R'-NH_2, H_2N-R'-CH_2-R'-NH_2,$ $$H_2N-R'-\underset{\underset{O}{\|}}{C}-R'-NH_2, H_2N-R'-\underset{\underset{O}{\|}}{\overset{O}{\|}}{S}-R'-NH_2$$

and $H_2N-R'-S-R'-NH_2$ wherein R′ is a divalent aromatic hydrocarbon radical hereinbefore indicated. The aromatic content of the diamine provides the thermal properties in the polymer while the primary amino groups permit the desired imide rings and amide linkages to be formed in the polymer. Generally, the aromatic diamine has from one to about four aromatic rings, advantageously from one to about two aromatic rings. The aromatic diamines having more than one aromatic ring may be further characterized as polycyclic aromatic compounds having two primary amino groups on an interconnected polycyclic aromatic nucleus. The aromatic rings may be interconnected by condensation, as in naphthalene or in phenanthrene-type structures, or may be bridged, either directly as in diphenyl diamines, or indirectly as, for example, two R' groups are joined with reactive stable inert linkages such as oxy, methylene, ethylene, carbonyl, sulfonyl, and other relatively inactive groups such as sulfide groups as hereinbefore described. Suitable nuclei (R' divalent aromatic hydrocarbon radical) include phenylene, naphthalene, anathrylene, naphthacenylene and the like; diphenylene, terphenylene, phenyl-naphthalene, quaterphenylene and the like; and aromatic rings separated by oxy, methylene, ethylene, carbonyl, sulfonyl and thio groups.

Advantageously, the linkages between the aromatic groups are oxy, or methylene and the amino groups are in the meta or para position in the aromatic nucleus. Preferable diamines are m-phenylenediamine and p,p'-methylenebis(aniline).

Usually, the reaction is carried out in the presence of an organic solvent such as N,N-dimethylacetamide, N-methylpyrrolidone, N,N-dimethylformamide, dimethylsulfoxide and the like, with N,N-dimethylacetamide and N-methylpyrrolidone being preferred. The reaction is suitably carried out under substantially anhydrous conditions and at a temperature below about 150° C. and advantageously at about 50° C. although temperatures down to about 10° C. are also very suitable. The time of reaction depends primarily on the temperature, varying from about 1–24 hours, with 2 to 4 hours at 40–60° C. recommended. The structure of the amine also affects the rate of reaction.

The reactants are preferably present in essentially an equimolar ratio. Variation with limits of plus or minus three mole percent of either starting material will usually have only minor effects on product properties. Variations as high as plus or minus ten mole percent may be suitable for less demanding applications than wire coating enamels from the standpoint of high flexural requirements.

The initial reaction between the acyl halide derivative of trimellitic anhydride and the diamine results in a high molecular weight polyamide having an amide content of greater than about 50 percent of the linking units in the polymer. The amide content varies from 55 to 100 percent and the imide content is from 0 to 45 percent. Such products are readily soluble in such organic solvents as dimethylacetamide, N-methylpyrrolidone, N,N-dimethylformamide, N,N-dimethylsulfoxide and the like.

The reaction is a process for preparing high molecular weight solid polymers having film-forming properties and having solubility in an organic solvent, which process comprises reacting essentially equimolar amounts of an aromatic primary diamine and an acyl halide derivative of trimellitic anhydride which contains at least one acyl halide group and that in the 4-ring position, in an organic solvent, under substantially anhydrous conditions and for a period of time and at a temperature controlled to produce a polymer with free carboxyl groups and amide groups available for further reaction, the polymer being soluble in said organic solvent. Further details of the preparation of the polyamide-imide polymers can be found in Canadian Patent 756,179.

The process for preparing a molding powder of a polytrimellitamide-imide with good physical properties comprises the steps of (a) treating the polytrimellitamide-imide consisting essentially of recurring units of: (i) structures containing both amido and imido linkages

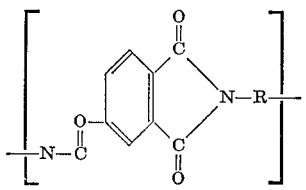

wherein R is a divalent aromatic organic radical and wherein the amount of the latter structure may vary from essentially 0 to about 45 percent; and (ii) structures containing amido linkages

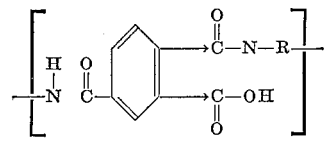

wherein → denotes isomerism, and wherein R is a divalent aromatic organic radical, with a nitrogen or a sulfoxide containing organic polar solvent and water or organic diluent having a boiling point below that of the organic polar solvent, wherein the amount of the organic polar solvent is 5 to 30 weight percent of the total treating solution, (b) volatilizing of the diluent from the treated polytrimellitamide-imide to remove substantially all of the diluent or volatilizing the solvent diluent mixture and then heating the polytrimellitamide-imide to a temperature above the boiling point of the diluent but below the boiling point of the organic polar solvent, to remove substantially all of the diluent, (c) then heating the polytrimellitamide-imide at a temperature of about 170–280° C. to remove the residual solvent, but heating at a rate so that degradation is avoided at the surface of the polytrimellitamide-imide powder.

The solid molding powder is prepared by treating the polyamide-imide polymer prepared as described above with a binary solvent mixture of an organic polar solvent and a miscible non-solvent, care being taken to ensure uniform distribution. Suitable organic solvents are phenol, substituted phenols such as ortho, meta and para-cresols, N-methylpyrrolidone, dimethylacetamide and dimethylsulfoxide. The nitrogen containing organic solvents are preferred. Suitable diluents include diluents such as, for example, hexane, pentane, heptane, octane, decane, undecane and their corresponding alcohols. The preferred diluent, however, is water. Suitable solutions are about 5 to 30 percent nitrogen containing organic polar solvent and about 95 to 70 percent of the diluent such as water. When the nitrogen containing polar solvent level is too high, caking and/or balling is encountered, resulting in processing difficulties. When not enough organic solvent is used, the molding specimens have inferior physical properties. In general, sufficient diluent or water is used to give a semi-damp powder. The semi-damp powder suitably contains 50 to 65 percent of the polyamide-imide polymer, 20 to 40 percent water and 3 to 15 percent of the nitrogen containing organic solvent. The diluent, such as for example water, functions to dilute the nitrogen containing organic solvent, and to distribute the solvent without polymer plasticization (i.e., solubilization of polymer at surface of the aggregate mass) occurring on the surface of the powder at room temperature. The preferred diluent also appears to positively contribute to improved mold specimen properties when present during the preheating step. The preheating or precuring is conducted at a temperature of about 170 to 280° C. for 3 to 5 hours.

The binary mixture's composition varies depending on the solvating power of the polar solvent. In general, the better the solvent for the unprocessed powder, the more dilute the binary mixture in order to avoid localized solvation which produces agglomerates. Relative solubility, in turn, depends on the type of diamine which is employed in synthesizing the polymer. For alkylene bis aniline types and bi-phenyl and mononuclear diamines (for example, m-phenylene diamine) a typically suitable mixture is about 10 to 30 percent N-methylpyrrolidone in water. The binary treating solution is added to the unprocessed powder in any convenient manner and the mixture intermixed to ensure uniform distribution of the binary solution over the surface of the powder particles.

In practice it has been found convenient to place the powder and treating solution in an enclosed container and tumble the contents until good distribution is ensured.

Alternatively the process can be conducted by dissolving the polytrimellitamide-imide in a nitrogen or sulfoxide organic polar solvent, precipitating the polymer into an organic polar solvent and water mixture wherein the organic polar solvent has a boiling point above the water and wherein the amount of the organic polar solvent is 5 to 30 weight percent of the solution and the water is 95 to 70 percent, filtering-off the precipitated polymer and then heating the damp polytrimellitamide-imide powder to a temperature above the boiling point of the water, but below the boiling point of the organic polar solvent, to remove substantially all of the water and then heating the polytrimellitamide-imide at a temperature of bout 170–280° C. to remove the residual solvent but heating at a rate so that degradation is avoided at the surface of the polytrimellitamide-imide powder.

Generally, for optimum molding-grade properties, the starting powder should be adjusted so that a 32 percent solution of the polymer in N-methylpyrrolidone gives a Brookfield viscosity of between 10–35 poises. There is a tendency for polymers of higher solution viscosity to more tenaciously retain the polar, treating-solvent of the invention. This effect results in either degradation during the precuring step or later when the treating powder is molded at high temperatures.

The molding powders prepared according to the process of this invention are used to fabricate shaped articles. The molding is advantageously conducted at temperatures of about 575 to 700° F. and about 200 to 25,000 p.s.i. Preferred conditions are about 575 to 650° F. and about 2,000 to 10,000 p.s.i. In order to produce molded polymer sheets which will not blister at elevated temperatures and which will thermally age at 550° F., a gradal increase in pressure is necessary to ensure escape of volatiles and avoid entrapped air.

A molded polymer sheet was prepared from a polyamide-imide prepared from the 4-acid chloride of trimellitic anhydride and metaphenylenediamine according to the following procedure. The molded powder was pre-heated to a temperature of about 625° F. and was molded as given in Table I.

TABLE I

| Pressure, p.s.i. | Time, minutes | Temp., ° F. |
| --- | --- | --- |
| 0 | 7 | RT–625 |
| 210 | 3 | 625 |
| 420 | 2 | 625 |
| 840 | 2 | 625 |
| 1,260 | 3 | 625 |
| 2,100 | 2 | 625 |
| 4,200 | 3 | 625 |
| 2,100 | 5 | 625 |

The invention is further exemplified by the following examples. Obviously, many variations in reaction and workup and conversion procedures can be used to increase the versatility of the process. It will be apparent to one skilled in the art that changes may be made by routine use of various temperatures, solvents and additional chemicals without departing from the invention defined in the claims.

EXAMPLE I

In a large vessel equipped with nitrogen purge, 6,055 parts by weight of dimethylacetamide and 1,670 parts by weight of methylenebis(aniline) were charged. Stirring was maintained for 10 minutes to allow complete solution to occur. Addition of the 4-acid chloride of trimellitic acid anhydride was begun and 1,775 parts by weight were added over a period of 4 hours. The process was conducted with external cooling and the temperature was held at about 50° C. throughout the addition period. An additional 3 hour hold period at 50° C. was used and the resulting polymer was then precipitated in a Fitz Mill using water in roughly three times the volume of solution to be precipitated. Three and a half hours were required for precipitation. The polymer was washed three times in a slurry tank to remove hydrochloric acid and was then centrifuged to remove gross water. Drying was conducted in a rotary drum dryer at 300° F.—two passes being necessary to give the desired 85 percent solids level. After mixing in a blender to insure uniformity, the polymer is ready for processing as a molding powder. The polymer had the following physical properties:

(a) percent solids: 85%
(b) percent occluded water: 15% (Occluded water refers to entrained water of imidization and process water remaining from the condensation synthesis and subsequent precipitation.)
(c) Brookfield viscosity: 32 poises of 32 percent solution in N-methylpyrrolidone
(d) Particle size: smaller than #32 mesh Three hundred gm. of powder was charged to a one gallon glass container. A binary solvent mixture of 34 cc. of N-methylpyrrolidone in 148 cc. of water was added in small portions with mixing until the entire binary mixture had been added.

The thus dampened powder was tumble-agitated for several hours to ensure uniform distribution of the treatment solvent. The tumbled powder was then transferred into a one gallon rotary oven fitted with a nitrogen purge. The powder was precured under the following conditions:

| Temperature, ° C. | Time, min. | Nitrogen flow, cc./min. |
| --- | --- | --- |
| 125 | 25 | 0. |
| 125–170 | 25 | 4,000 (Air). |
| 170 | 15 | 4,000 (Air). |
| 170–250 | 25 | 4,000 (Air). |
| 250 | 30 | 4,000 (Air). |
| 250 | 60 | 4,000 (Nitrogen). |

The processed powder was tan to brown in color and was removed while still hot from the oven and transferred to a scaled container and cooled therein. Retained volatile content at ambient temperature was determined for a 2 gm. sample by heating 30 minutes at 550° F.; retained volatiles were 0.02 percent.

Sheets were molded from the processed powder by compression molding at 4000 p.s.i. at 600° F. for 13 minutes. The sheet was tested and found to have the following properties:

Tensile, p.s.i. _____ 14,900
Percent elongation (ASTM D–638) _____ 8.5
Flexural strength (ASTM D–790) _____ 23,800
Modulus of elasticity×$10^6$ (ASTM D–790) ____ 0.538
Heat deflection temperature (° F.) (ASTM D–648) _____ 486
Izod impact (ASTM D–256) _____ 1.1
Barcol hardness (ASTM D–1706) _____ 47

EXAMPLE II

In a large vessel equipped with nitrogen purges, 2,920 parts by weight of dimethylacetamide and 444 parts by weight of meta-phenylene diamine were charged. Stirring was maintained for 10 minutes to allow complete solution to occur. Addition of the 4-acid chloride of trimellitic acid anhydride was begun and 865 parts by weight were added over a period of 4 hours. The process was conducted with external cooling and the temperature was held at about 26° C. throughout the addition period. An additional 3 hour hold period at 30° C. was used and the resulting polymer was then precipitated in a Fitz Mill using water in roughly three times the volume of solution to be precipitated. Three and a half hours were required for precipitation. The polymer was washed three times in a slurry tank to remove hydrochloric acid and was then centrifuged to remove gross water. Drying was conducted in a rotary drum at 300° F.—two passes being necessary to give the desired 85 percent solids level. After mixing in a blender to insure uniformity, the polymer is ready for processing as a molding powder. The polymer had the following physical properties:

Percent solids—85%
Brookfield viscosity of a 32% solution in NMP—15 poises at 25° C.
Acid titer—2.53 milliequivalent/gram
Particle size—less than #32 mesh A binary solvent mixture of 24 cc. of dimethylacetamide in 148 cc. of water was added to the powder and handled in the manner of Example I. The precuring cycle was as follows:

| Temperature, °C. | Time, min. | Nitrogen flow, cc./min. |
|---|---|---|
| 125–130 | 20 | 1,100 |
| 150 | 10 | 1,100 |
| 170 | 30 | 4,000 |
| 170–250 | 40 | 4,000 |
| 250 | 20 | 4,000 |
| 250–280 | 30 | 4,000 |
| 280 | 60 | 4,000 |

Volatiles were calculated to be 0.16 percent. Sheet was molded from the processed powder under the same conditions of Example I for 25 minutes. The resultant powder molded satisfactorily into an article that was easily removed from the mold without fracture.

EXAMPLE III

Trimellitamide-imide powder based on meta-phenylene diamine and the 4-acid chloride of trimellitic acid anhydride was treated as in Example II. However, prior to precuring the powder, water was removed with vacuum until the powder contained 15 percent occluded water and only 5 percent treating water from the binary mixture. The powder thus dried was precured as in Example II but eliminating the water-removal temperature cycle (125–130° C.). The resultant powder molded satisfactorily into an article that was easily removed from the mold without fracture.

EXAMPLE IV

The powder of the type used in Example 1 was processed under substantially the same conditions of precure and molding as Example I. The composition of the binary solvent mixture was varied with the following effect on tensile values of the molded test specimen:

| Run No. | Composition of processed powder in weight percent | | | Tensile, p.s.i. ASTM |
|---|---|---|---|---|
| | N-methylpyrrolidone | Water | Powder [1] | |
| 1 | 6.2 | 31.0 | 62.8 | 9,000 |
| 2 | 7.2 | 30.7 | 62.1 | 14,900 |
| 3 | 11.0 | 29.5 | 59.5 | 11,200 |

[1] "Powder" is the weight of dry powder plus the weight of occluded water (usually about 15% of the total).

EXAMPLE V

The powder of the type used in Example II was processed under substantially the same conditions of precure and molding as in Example II. The composition of the binary solvent mixture was varied with the following effect on the tensile values of the molded test specimen:

| Run No. | Composition of processed powder in weight percent | | | Tensile, p.s.i. ASTM |
|---|---|---|---|---|
| | N-methylpyrrolidone | Water | Powder [1] | |
| 4 | 4.1 | 31.6 | 64.3 | [2] 18,970 |
| 5 | 5.0 | 31.4 | 63.6 | 18,000 |
| 6 | 7.1 | 30.6 | 62.3 | 13,340 |

[1] "Powder" is the weight of dry powder plus the weight of occluded water (usually about 15% of the total).
[2] Replicate tensiles based on three samples.

We claim:
1. A process for preparing a solid molding powder of polytrimellitate amide-imides, which comprises the steps of (a) treating a polyamide-imide consisting essentially of recurring units of: (i) structures containing both amido and imido linkages

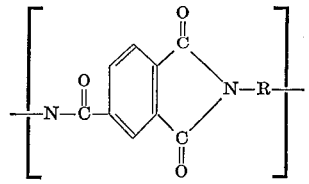

wherein R is a divalent aromatic organic radical; and (ii) structures containing amido linkages

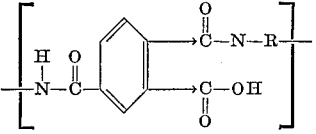

wherein → denotes isomerism, and wherein R is a divalent aromatic organic radical, with a nitrogen or a sulfoxide containing organic polar solvent and a miscible diluent having a boiling point below that of the organic polar solvent wherein said diluent is selected from the group consisting of alkanes and their corresponding alcohols, and water, wherein the amount of the organic polar solvent is 10 to 30 weight percent of the total solution, and the amount of the diluent is 70 to 90 percent of the total solution; (b) volatilizing off the diluent from the treated polytrimellitamide-imide to remove substantially all of the diluent; (c) then heating the polytrimellitamide-imide at a temperature of about 170–280° C. to remove the residual solvent and produce a polytrimellitamide-imide molding powder having good physical properties.

2. A process for preparing a molding powder of a polytrimellitamide-imide with good physical properties which comprises the steps of: (a) treating the polytrimellitamide-imide consisting essentially of recurring units of: (i) structures containing both amido and imido linkages

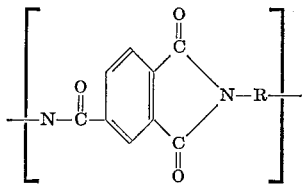

wherein R is a divalent aromatic organic radical; and (ii) structures containing amido linkages

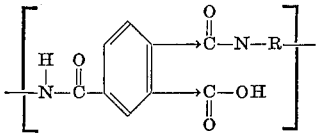

wherein → denotes isomerism, and wherein R is a divalent aromatic organic radical, with a nitrogen or a sulfoxide containing organic polar solvent and water, wherein the organic polar solvent has a boiling point above water and wherein the amount of organic polar solvent is 10 to 30 weight percent of the total solution, the remainder being water; (b) heating the treated polytrimellitamide-imide to a temperature above the boiling point of the water, but below the boiling point of the organic polar solvent, to remove substantially all of the water; (c) then heating the polytrimellitamide-imide at a temperature of about 170–280° C. to remove the residual solvent but heating at a rate so that the degradation is avoided at the surface of the polytrimellitamide-imide powder.

3. The process of claim 2 wherein the nitrogen containing organic polar solvent is N-methylpyrrolidone.

4. The process of claim 2 wherein R is:

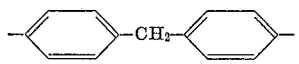

5. The process of claim 2 wherein R is:

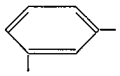

6. A process for preparing a solid molding powder of at least one polytrimellitate amide-imide which comprises the steps of: (a) dissolving the polytrimellitamide-imide consisting essentially of recurring units of: (i) structures containing both amido and imido linkages.

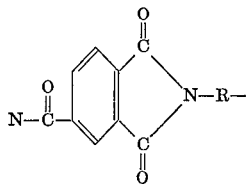

wherein R is a divalent aromatic organic radical; and (ii) structures containing amido linkages

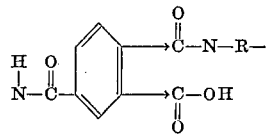

wherein → denotes isomerism, and wherein R is a divalent aromatic organic radical, with a nitrogen or sulfoxide organic polar solvent; (b) precipitating the polytrimellitamide-imide with an organic polar solvent and water mixture wherein the organic polar solvent has a boiling point above the water and wherein the amount of the organic polar solvent is 10 to 30 weight percent of the solution, the remainder being water; (c) recovering the polytrimellitate amide-imide as a semi-damp filter cake and then heating the filtrate to a temperature above the boiling point of the water, but below the boiling point of the organic polar solvent, to remove substantially all the water and then; (d) heating the polytrimellitamide-imide at a temperature of about 170–280° C. to remove the residual solvent but heating at a rate so that the degradation is avoided at the surface of the polytrimellitamide-imide powder.

References Cited

UNITED STATES PATENTS

| | | | |
|---|---|---|---|
| 3,182,073 | 5/1965 | Loncrini | 260—246.3 |
| 3,260,691 | 7/1966 | Lavin et al. | 260—30.2 |
| 3,347,808 | 10/1967 | Lavin et al. | 260—29.1 |
| 3,347,828 | 10/1967 | Stephens et al. | 260—47 |
| 3,428,486 | 2/1969 | George | 117—218 |
| 3,453,292 | 7/1969 | Izumi et al. | 260—346.3 |
| 3,435,002 | 3/1969 | Holub | 260—46.5 |
| 3,472,815 | 10/1969 | Juveland | 260—47 |

FOREIGN PATENTS

| | | | |
|---|---|---|---|
| 439,736 | 12/1967 | Switzerland | 260—78 |

WILLIAM H. SHORT, Primary Examiner

H. SCHAIN, Assistant Examiner

U.S. Cl. X.R.

260—47, 63; 264—331